US012670095B2

(12) United States Patent
    Brewer

(10) Patent No.: US 12,670,095 B2
(45) Date of Patent: Jun. 30, 2026

(54) HYBRID CACHE COHERENCY

(71) Applicant: Micron Technology, Inc., Boise, ID (US)

(72) Inventor: Tony M. Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 51 days.

(21) Appl. No.: 18/745,473

(22) Filed: Jun. 17, 2024

(65) Prior Publication Data

US 2025/0061059 A1 Feb. 20, 2025

Related U.S. Application Data

(60) Provisional application No. 63/533,477, filed on Aug. 18, 2023.

(51) Int. Cl.
    G06F 12/0802 (2016.01)

(52) U.S. Cl.
    CPC ...... G06F 12/0802 (2013.01); *G06F 2212/60* (2013.01)

(58) Field of Classification Search
    None
    See application file for complete search history.

(56) References Cited

U.S. PATENT DOCUMENTS

| | | |
|---|---|---|
| 7,177,987 B2 | 2/2007 | Van Doren et al. |
| 10,339,059 B1 | 7/2019 | Mattina |
| 10,949,352 B1 | 3/2021 | Kimelman |
| 2020/0159665 A1* | 5/2020 | Berger .................. G06F 12/084 |
| 2022/0092002 A1 | 3/2022 | Yasufuku |

FOREIGN PATENT DOCUMENTS

KR 20220054366 5/2022

OTHER PUBLICATIONS

"International Application Serial No. PCT US2024 034337, International Search Report mailed Sep. 30, 2024", 3 pgs.
"International Application Serial No. PCT US2024 034337, Written Opinion mailed Sep. 30, 2024", 3 pgs.

* cited by examiner

*Primary Examiner* — Charles J Choi

(74) *Attorney, Agent, or Firm* — Schwegman Lundberg & Woessner, P.A.

(57) ABSTRACT

To implement a hybrid of software and hardware coherency management, a device can receive an unrestricted-access read request for memory that corresponds to a cache line from a first host and record an indication of the unrestricted-access read request with respect to the cache line. Here, the indication can include an identifier for the first host. However, if the device receives a shared-access read request for the cache line from a second host, the device does not record an identifier of the second host. Rather, the device can communicate an invalidation request for the cache line to the first host using the identifier for the first host to provoke the first host to write-back the data and invalidate the cache line.

20 Claims, 7 Drawing Sheets

Figure 5:
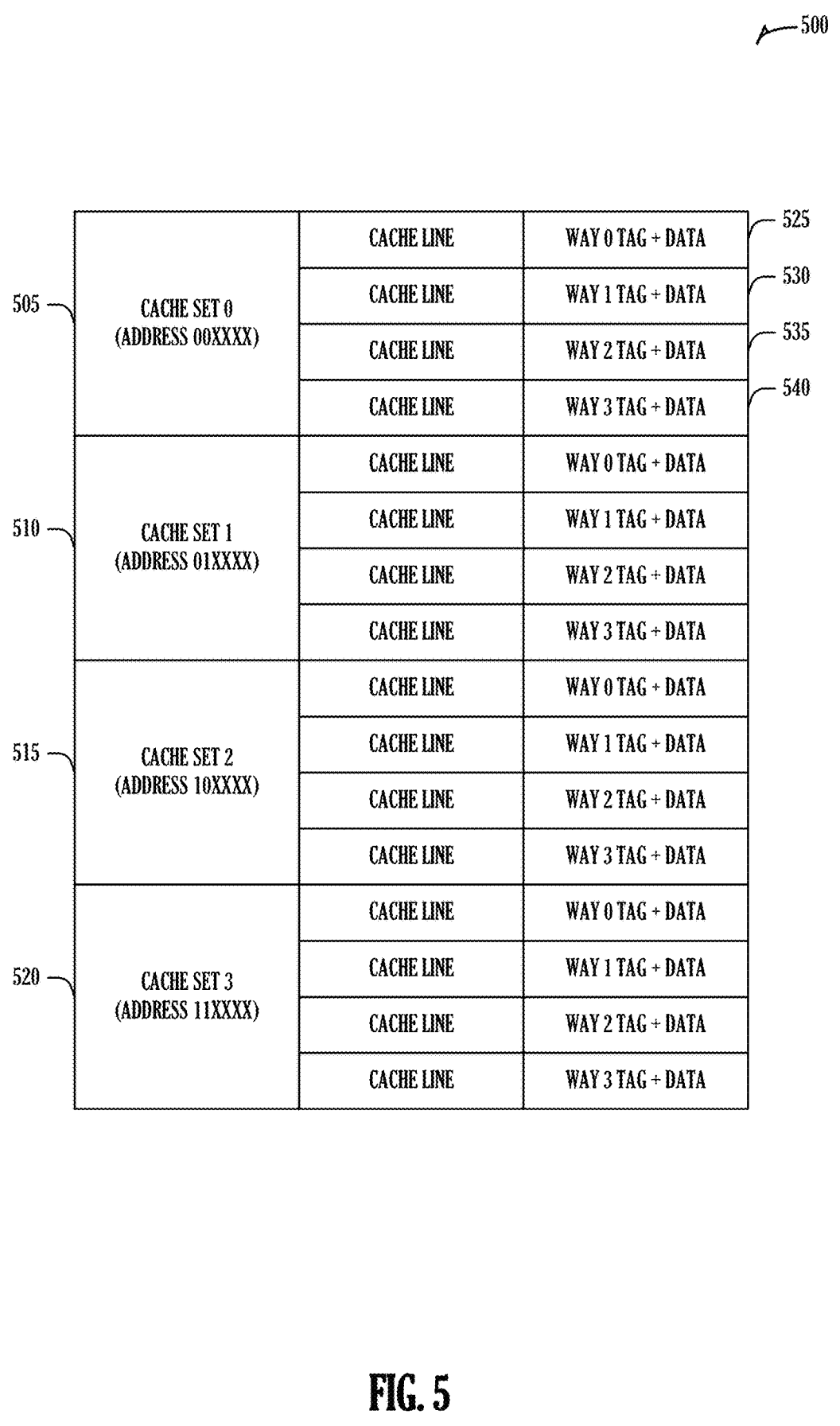

—500

| | | CACHE LINE | WAY 0 TAG + DATA | — 525 |
|---|---|---|---|---|
| 505 — | CACHE SET 0 (ADDRESS 00XXXX) | CACHE LINE | WAY 1 TAG + DATA | — 530 |
| | | CACHE LINE | WAY 2 TAG + DATA | — 535 |
| | | CACHE LINE | WAY 3 TAG + DATA | — 540 |
| 510 — | CACHE SET 1 (ADDRESS 01XXXX) | CACHE LINE | WAY 0 TAG + DATA | |
| | | CACHE LINE | WAY 1 TAG + DATA | |
| | | CACHE LINE | WAY 2 TAG + DATA | |
| | | CACHE LINE | WAY 3 TAG + DATA | |
| 515 — | CACHE SET 2 (ADDRESS 10XXXX) | CACHE LINE | WAY 0 TAG + DATA | |
| | | CACHE LINE | WAY 1 TAG + DATA | |
| | | CACHE LINE | WAY 2 TAG + DATA | |
| | | CACHE LINE | WAY 3 TAG + DATA | |
| 520 — | CACHE SET 3 (ADDRESS 11XXXX) | CACHE LINE | WAY 0 TAG + DATA | |
| | | CACHE LINE | WAY 1 TAG + DATA | |
| | | CACHE LINE | WAY 2 TAG + DATA | |
| | | CACHE LINE | WAY 3 TAG + DATA | |

605 — RECEIVE UNRESTRICTED ACCESS REQUEST FOR A CACHE LINE FROM A HOST

610 — TRACK HOST FOR THE UNRESTRICTED ACCESS REQUEST

615 — RECEIVE SHARED ACCESS REQUEST FROM SECOND HOST

620 — TRANSMIT BACK-INVALIDATION REQUEST TO FIRST HOST

HYBRID CACHE COHERENCY

PRIORITY APPLICATION

This application claims the benefit of priority to U.S. Provisional Application Ser. No. 63/533,477, filed Aug. 18, 2023, which is incorporated herein by reference in its entirety.

STATEMENT REGARDING GOVERNMENT SUPPORT

This invention was made with Government support under Agreement No. PNNL Phase 1, awarded by Pacific Northwest National Laboratory (PNNL). The Government has certain rights in the invention.

TECHNICAL FIELD

Embodiments described herein generally relate to computer memory and more specifically to hybrid cache coherency.

BACKGROUND

Memory devices for computers or other electronic devices can be categorized as volatile and non-volatile memory. Volatile memory uses power to maintain its data (e.g., is periodically refreshed), and includes random-access memory (RAM), dynamic random-access memory (DRAM), or synchronous dynamic random-access memory (SDRAM), among others. Non-volatile memory generally retains stored data in the absence of a power source, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others. Persistent memory is an architectural property of the system where the data stored in the media is available after system reset or power-cycling. In an example, non-volatile memory media can be used to build a system with a persistent memory model.

Memory devices can be coupled to a host (e.g., a host computing device) to store data, commands, or instructions for use by the host while the computer or electronic system is operating. For example, data, commands, or instructions can be transferred between the host and the memory device during operation of a computing or other electronic system.

Various protocols or standards can be applied to facilitate communication between a host and one or more other devices such as memory buffers, accelerators, or other input/output devices. In an example, an unordered protocol, such as Compute Express Link (CXL), can be used to provide high-bandwidth and low-latency connectivity.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 5 illustrates an example of an associative cache, according to an embodiment.

DETAILED DESCRIPTION

Figure 1:
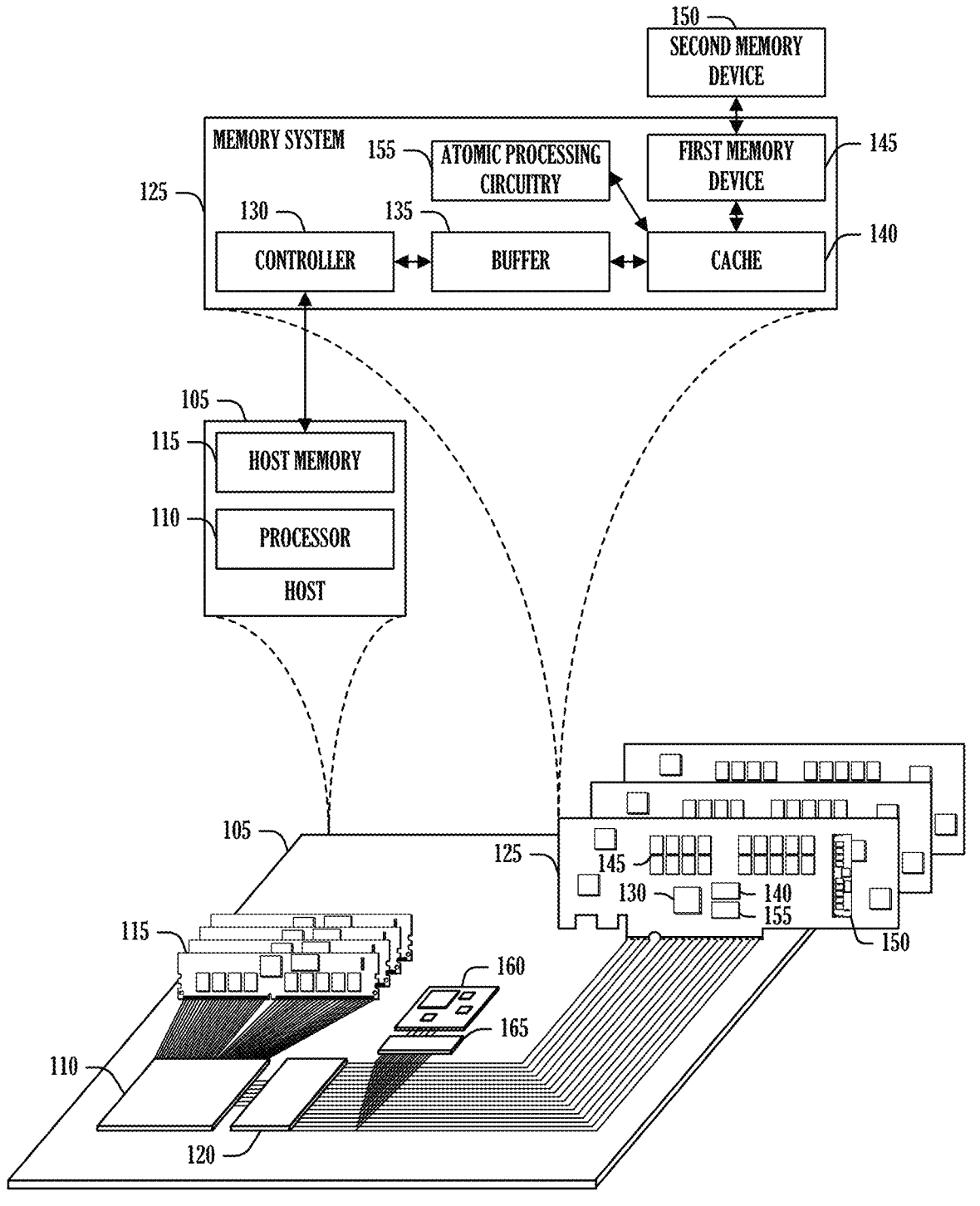
FIG. 1 is a block diagram of an example of an environment including a system for hybrid cache coherency, according to an embodiment.

Compute Express Link (CXL) is an open standard interconnect configured for high-bandwidth, low-latency connectivity between host devices and other devices such as accelerators, memory buffers, or smart input-output (I/O) devices. CXL was designed to facilitate high-performance computational workloads by supporting heterogeneous processing and memory systems. CXL provides memory semantics and mechanisms for cache coherency on top of PCI Express (PCIe)-based I/O semantics for optimized performance.

CXL can be a useful component in a variety of applications such as artificial intelligence, machine learning, analytics, cloud infrastructure, edge computing devices, communication systems, and elsewhere, to provide flexible connectivity to memory or accelerators for a host processor platform. Data processing in such applications can use various scalar, vector, matrix, or spatial architectures that can be deployed in CPU, GPU, FPGA, smart NICs, or other accelerators that can be coupled using a CXL link. Near memory accelerators, in which an accelerator is collocated with memory, provide low latency processing while expanding system capabilities.

CXL supports dynamic multiplexing using a set of protocols that includes I/O (CXL.io, based on PCIe), caching (CXL.cache), and memory (CXL.memory) semantics. In an example, CXL can be used to maintain a unified, coherent memory space (e.g., cache coherence) between the CPU (e.g., a host device or host processor) and any memory managed (e.g., at) the CXL device. This configuration enables the CPU and other devices to share resources and operate on the same memory region for higher performance, reduced data-movement, and reduced software stack complexity. Memory coherency, or cache coherency, maintains a consistent state between copies of data. For example, if a cache is used to speed access to memory, there are two different locations in which "the same data" is stored. If the cache is written by a processor, for example, then the cache state is different from the corresponding memory state. Addressing the write-back of the cache is a form of maintaining memory coherency.

The CXL 3.0 specification discusses support for hardware or software coherency. In this specification, for hardware coherency, the memory device (e.g., Global Fabric Attached Memory (GFAM CXL)) device, tracks host private ownership of data (e.g., "ANY" CXL meta state in which host is the owner) and host shared ownership (e.g., "SHARED"

meta state and list of sharing devices or hosts). Hardware coherency enables an application to access memory without consideration of coherency because the hardware ensures that the latest memory location data (e.g., current, and not stale data) is accessed. Generally, hardware coherency involves maintaining a sharing list that tracks each host that requests SHARED (e.g., read only) access to a memory line. When that line is updated, the hardware would generally broadcast this to the hosts in the shared list. Upon receiving the broadcasts, the hosts can then update their local caches, if necessary. The sharing lists and broadcasts can result in excessive, wasteful, resource use in many circumstances because the hardware is unaware of how the software intends to use the data.

Software coherency, according to the CXL 3.0 specification, puts the responsibility of coherency on the application (e.g., the host). Here, the memory device does not track host ownership (e.g., ANY or SHARED). Instead, the software (e.g., application) is responsible for ensuring that it is tracking data locations and accessing (e.g., addressing) the latest memory location data. The activities the software may perform to ensure such correct access can include flushing a cache after modifying data in the cache or invalidate instruction to indicate that a cache or memory is stale. The software coherency approach is much simpler for hardware but more complicated for software. In an example, certain memory operations may not be supported by software coherency, such as an Industry Standard Architecture (ISA) issued GFAM memory atomic operations. In this example, the software generally does not have visibility into the operations of the memory device atomic unit and thus cannot determine when an atomic operation has updated a cache or memory.

Additional overhead of maintaining coherency is a concern of any coherency protocol. Hardware coherency generally entails performing coherency operations only when the data is to be used. However, hardware-based coherency can also result in additional overhead. For example, if a GFAM, or other, memory controller receives a request by one host to access memory being held privately by a second host, the memory controller must send a back invalidate to the second host to retrieve the data and ownership of the memory line. The transaction used to obtain dirty data can require four packets that must transition from memory device to host or from host to memory device. The alternative is for the second host to flush its data back to memory using, for example, ISA instructions. When the host flushes its own dirty data back to memory, this takes only two packet transitions, and it can be out of the critical path for the first host to get its data.

This performance issue with hardware-based coherency can be avoided by having the host processor flush dirty data back to memory even when hardware-based coherency is being used. For large data structures flushing the data back to memory using ISA instructions is probably worth the application code (e.g., software) complexity. For small data structures (e.g., a memory a line or two), the application code complexity is probably not worth the effort (e.g., in saved effort or improved application performance). With hardware-based private ownership tracking an option to have the application flush the dirty data back to memory can be used. With software-based coherency you must always flush the dirty data back to memory for all structure sizes or incorrect results can occur.

To address the issues of hardware concurrency and the limitations of software coherency, a hybrid coherency technique, described herein, can be used. Hybrid coherency includes some hardware based tracking of data ownership yet the responsibility of maintaining coherency rests in the software. The hardware based tracking enables the hardware to notify software of which devices (e.g., hosts) are accessing the data such that a host that changes the data can be alerted to notify devices when cache data is changed, for example. Hybrid coherency provides a middle ground between fully hardware supported coherency and software coherency; providing the benefits of hardware coherency without the hardware coherency complexity or efficiency impacts (e.g., cost to produce, resource overhead, increased latency, etc.). Hybrid coherency supports tracking of host private ownership (e.g., "ANY" meta state and which host is the owner) and host "SHARED" meta state on data (e.g., memory lines). In an example, the hardware does not track which host has a memory line in a SHARED state, but rather that the memory line is shared. Here, it is sufficient to notify the private ownership host—the host that can change the data in the memory line—that there are other devices sharing (e.g., reading) the memory.

Hybrid coherency memory tracking avoids the complexities involved in maintaining the sharing list (e.g., which hosts are sharing) across all possible host root ports, such as a sharing list of 256 bits per memory line. The described hybrid coherency tracking also eliminates broadcasting invalidate requests to all hosts in the sharing list. Rather, the tracking data provided to a host that changes the data enables that host to coordinate cache line write-back and invalidation at appropriate points in time, such as immediately after gaining access to a data structure held with a lock. Further, because the hardware has visibility into atomic operations on the memory device, the hybrid coherency can be used when atomics, or other near-memory compute, operates, eliminating host data flush operations just prior to issuing near memory assist operations.

FIG. 1 illustrates an example of an environment including a system 105 for hybrid coherency, according to an embodiment. The system 105 includes a first host 110 (e.g., central processing unit (CPU)) and a second host 160 (e.g., an accelerator), and a memory system 125. The first host 110 may have directly attached host memory 115 in the system 105. In an example, the system 105 is, or is part of, a server computer, workstation, personal laptop computer, a desktop computer, a digital camera, a smart phone, a memory card reader, Internet-of-thing enabled device, or the like. The first host 110 or the second host 160 can include one or more processor cores, a system of parallel processors, or other CPU arrangements.

The memory system 125 includes a controller 130, a buffer 135 (e.g., internal state memory), a cache 140, and a first memory device 145. The first memory device 145 can include, for example, one or more memory modules (e.g., single in-line memory modules, dual in-line memory modules, etc.). The first memory device 145 can include volatile memory or non-volatile memory. The first memory device 145 can include a multiple-chip device that comprises one or multiple different memory types or modules. In an example, the system 105 includes a second memory device 150 that interfaces with the memory system 125 and the first host 110.

The system 105 can include a backplane and can include a number of processing resources (e.g., one or more processors, microprocessors, or some other type of controlling circuitry) including, or in addition to, the first host 110 and the second host 160. The system 105 can optionally include separate integrated circuits for the first host 110, the second host 160, the memory system 125, the controller 130, the buffer 135, the cache 140, the first memory device 145, the second memory device 150, any one or more of which can comprise respective chiplets that can be connected and used together. In an example, the system 105 includes a server system or a high-performance computing (HPC) system or a portion thereof. Embodiments of the first host 110, or other components of the system 105, can be implemented in Von Neumann or in non-Von Neumann architectures, which can include one or more components (e.g., CPU, ALU, etc.) often associated with a Von Neumann architecture, or can omit these components.

In an example, the first memory device 145 can provide a main memory for the system 105, or the first memory device 145 can comprise accessory memory or storage for use by the system 105. In an example, the first memory device 145 or the second memory device 150 includes one or more arrays of memory cells, e.g., volatile or non-volatile memory cells. The arrays can be flash arrays with a NAND architecture, for example. Embodiments are not limited to a particular type of memory device. For instance, memory devices can include RAM, ROM, DRAM, SDRAM, PCRAM, RRAM, and flash memory, among others.

In embodiments in which the first memory device 145 includes persistent or non-volatile memory, the first memory device 145 can include a flash memory device such as a NAND or NOR flash memory device. The first memory device 145 can include other non-volatile memory devices such as non-volatile random-access memory devices (e.g., NVRAM, ReRAM, FeRAM, MRAM, PCM). Some memory devices—such as a ferroelectric RAM (FeRAM) devices that include ferroelectric capacitors—can exhibit hysteresis characteristics, such as a 3-D Crosspoint (3D XP) memory device, or combinations thereof.

In an example, the interface 120, or the interface 165, can include any type of communication path, bus, interconnect, or the like, that enables information to be transferred between the first host 110 or the second host 160 respectively, or other devices of the system 105, and the memory system 125. Non-limiting examples of interfaces can include a peripheral component interconnect (PCI) interface, a peripheral component interconnect express (PCIe) interface, a serial advanced technology attachment (SATA) interface, a Universal Serial Bus (USB) interface, a Thunderbolt interface, or a miniature serial advanced technology attachment (mSATA) interface, among others. In an example, the interface 120 includes a PCIe 5.0 interface that is compliant with the compute express link (CXL) protocol standard. Accordingly, in some embodiments, the interface 120 supports transfer speeds of at least 32 GT/s.

CXL is a high-speed central processing unit (CPU)-to-device and CPU-to-memory interconnect designed to enhance compute performance. CXL maintains memory coherency between the CPU memory space (e.g., the host memory 115 or caches maintained by the first host 110) and memory on attached devices or accelerators (e.g., the first memory device 145 or the second memory device 150). This arrangement enables resource sharing at higher performance, reduced software stack complexity, and lower overall system cost than other interconnect arrangements. CXL is an industry open standard interface for high-speed communications to accelerators that are increasingly used to complement CPUs in support of emerging data-rich and compute-intensive applications such as artificial intelligence and machine learning. The memory system 125 is illustrated with atomic processing circuitry 155 as an accelerator in order to perform near-memory operations. In general, the atomic memory operations (AMOs) performed by the atomic processing circuitry 155 include such small operations as incrementing a number at a memory address or multiply number in two memory addresses, etc. While AMOs are generally used for such operations, the manipulation of memory is not so restricted. For example, modern artificial neural network architectures generally involve the application of small additive or multiplicative operations or thresholding across vast swaths of artificial neurons. Because the computations are usually simple, but the data large, near memory execution of such operations is possible and beneficial given the illustrated architecture.

In an example, the controller 130 comprises a media controller such as a non-volatile memory express (NVMe) controller. The controller 130 can be configured to perform operations such as copy, write, read, error correct, etc. for the first memory device 145. In an example, the controller 130 can include purpose-built circuitry or instructions to perform various operations. That is, in some embodiments, the controller 130 can include circuitry or can be configured to perform instructions to control movement of data or addresses associated with data such as among the buffer 135, the cache 140, or the first memory device 145 or the second memory device 150.

In an example, at least one of the first host 110 or the controller 130 comprises a command manager (CM) for the memory system 125. The CM can receive a read command for a particular logic row address in the first memory device 145 or the second memory device 150. In an example, the CM can determine that the logical row address is associated with a first row based at least in part on a pointer stored in a register of the controller 130. In an example, the CM can receive, from the first host 110 or the second host 160, a write command for a logical row address. In an example, the write command is associated with second data. In an example, the CM can be configured to issue, to non-volatile memory and between issuing the read command and the write command, an access command associated with the first memory device 145 or the second memory device 150. In an example, the CM can issue, to the non-volatile memory and between issuing the read command and the write command, an access command associated with the first memory device 145 or the second memory device 150.

In an example, the buffer 135 comprises a data buffer circuit that includes a region of a physical memory used to temporarily store data, for example, while the data is moved from one place to another. The buffer 135 can include a first-in, first-out (FIFO) queue in which the oldest (e.g., the first-in) data is processed first. In some embodiments, the buffer 135 includes a hardware shift register, a circular buffer, or a list.

In an example, the cache 140 comprises a region of a physical memory used to temporarily store particular data from the first memory device 145 or the second memory device 150. Generally, the cache 140 provides faster access to data than the backing memory. The cache 140 can include a pool of data entries. In an example, the cache 140 can be configured to operate according to a write-back policy in which data is written to the cache without being concurrently written to the first memory device 145. Accordingly, in some embodiments, data written to the cache 140 does not have a corresponding data entry in the first memory device 145. This can occur when, for example, data is written to the cache and deleted before a write-back is triggered to write the data into the first memory device 145, for example.

In an example, the cache 140 is implemented as a multi-way associative cache. Here, cache entries are divided by some portion of a memory address (e.g., a set number of significant bits). A group of cache entries (e.g., cache lines or ways), called a cache set herein, can be co-associated with a same bit-set from the memory address. Usually, the number of ways in a cache set is less than the total number of memory addresses to which the ways are associated. Thus, a way can be evicted to be associated with a new memory address in the range at various points. FIG. 5 illustrates some elements of this type of associate cache.

In an example, the controller 130 can receive write requests involving the cache 140 and cause data associated with each of the write requests to be written to the cache 140. The controller 130 can similarly receive read requests and cause data that is stored in, for example, the first memory device 145 or the second memory device 150, to be retrieved and written to, for example, the first host 110 via the interface 120 or the second host 160 via the interface 165. In an example, the controller 130 processes all requests for memory it controls through the cache 140. Thus, a read request will first check the cache 140 to determine if the data is already cached. If not, a read to the first memory device 145 is made to retrieve the data. The data is then written to the cache 140. In an example, the data is then read from the cache 140 and transmitted to the requesting entity, such as the first host 110 or the second host 160. Working exclusively through the cache can simplify some elements of the controller 130 hardware at the cost of a little latency.

As noted above, hybrid coherency refers to hardware supported memory coherency that leaves aspects of coherency in an application (e.g., implemented in software). Generally, the hardware tracks an entity (e.g., host 110) that requests an ANY possession of memory (e.g., a memory line in the first memory device 145 or the second memory device 150) such that the entity can make any change (e.g., a write) to the memory. Additionally, the hardware can track whether or not an entity has made a SHARED (e.g., read only) access request to the memory. In an example, this shared tracking does not track specific entities (e.g., there is no list of host identifiers (IDs) of hosts that request the shared access). In this manner, this hardware implementation is simpler than other hardware-based coherency designs. Moreover, the hardware is responsible for fewer communications to entities for coherency. In general, the hardware notifies only the entity that has an ANY possession of the cache line when there is a subsequent request (either ANY or SHARED) for the line. Other communications about cache coherency are handled by software executing on the entities. This last element is the software portion of the hybrid coherency, enabling software design to reduce or eliminate the hardware tracking of host IDs for SHARED hosts as well as alerting these SHARED entities in case of coherency events. The hardware tracking described here and below is embodied in circuitry of the memory controller 130, although such circuitry can also be in the cache 140, or in a component of the memory system 125 not illustrated in FIG. 1.

The memory controller 130 (e.g., circuitry included therein) is configured to receive an unrestricted-access (e.g., ANY) read request—from a first host (e.g., host 110)—that corresponds to a cache line. As noted above, an ANY read request is a request for exclusive access to the cache line. There is an implication that the host 110 will be writing to the cache line when making an ANY request. Otherwise, it is generally more efficient for a SHARED read request to be made.

Generally, a SHARED read request is made when there is no intention by the host 110 to make a subsequent write request, following the traditional writing operations of reading the line into a local cache, modifying the line in the local cache, and then flushing the line to the memory system 125. However, some implementations may not make an ANY read request and instead follow a SHARED read request with a write request. In these scenarios, an optimization may be used in which the SHARED read access request is promoted to an ANY read request. Thus, in an example, the memory controller 130 is configured to receive a SHARED read request corresponding to the cache line from another host (e.g., host 160) after receipt of the ANY read request. Here, the memory controller 130 is configured to promote the SHARED read request to a second ANY read request based on a measurement made by the memory controller 130.

The measurement is some value that the memory controller 130 can ascertain and is correlated to a write request following a SHARED read request. Thus, if the memory controller 130 has a log of host request patterns (e.g., read followed by write) then the pattern can be measured from the logs. The logs may be simple or short lived, such that a flag is set on a read request and unset if the following request is also a read. The flag, if set when a write request arrives, can then indicate the pattern of writes following reads. Thus, in an example, the measurement is a pattern in requests to the memory controller 130. In an example, the pattern includes a write request following a SHARED read request. In an example, the pattern is in requests made by a single host. In an example, the pattern is in requests made by all hosts.

In an example, to promote the SHARED read request to the second ANY read request, the memory controller 130 is configured to determine whether the first host (host 110) did not write-back data to the cache line in response to the invalidation request (described below). If the host 110 did not write back after the ANY read request that the host 110 made, there is no additional work needed to promote the SHARED read request. However, if additional SHARED requests arrive, there is a penalty in assuming that the host 160 intended, or should have used, an ANY read request. Thus, in an example, the memory controller 130 is configured to transition the SHARED read request to a SHARED state (e.g., back from the promoted ANY stated if the transition occurred or to refrain from acting if the promotion did not occur) in response to an additional SHARED read request arriving before the SHARED read request is fully promoted (e.g., that exclusive access was granted to the host 160).

The memory controller 130 is configured to record (e.g., within the memory controller 130) an indication of the ANY read request with respect to the cache line. In an example, the indication includes an identifier for the host 110. The identifier enables the memory controller 130 to contact (e.g., address) the host 110 for communications, such as to request control of the cache line back (e.g., a back invalidate operation in CXL). In an example, the indication is recorded in meta data of the cache line.

The memory controller 130 is configured to receive a SHARED read request for the cache line from a second host (e.g., host 160). Based on (e.g., in response to) this receipt of the SHARED read request after the ANY read request of host 110, the memory controller is configured to communicate an invalidation request (e.g., CXL back-invalidate request or other communication to retrieve control or responsibility of the cache line) for the cache line to host 110 using the identifier for host 110 that was previously recorded. Here, the memory controller 130 refrains (e.g., does not) record an identifier for the host 160 based on the SHARED read request. This refraining from recording the host 160 identifier for a SHARED read request and the recording of the host 110 identifier for the ANY ready request is a difference in operation from traditional hardware-based coherency mechanisms. However, a second host identifier can be recorded in an example where the SHARED read request is promoted. In this example, an identifier for the host making a SHARED read request that is a candidate for promotion to ANY in the optimization described above, can be recorded to enable the eventual invalidation request for that host if necessary. However, generally, host identifiers for hosts that make SHARED read requests are not recorded or tracked by the memory controller 130. This simplifies the circuitry used to implement the hybrid coherency described herein. When a host identifier is not recorded, the memory controller 130 does not communicate with that host. Thus, the memory controller 130 does not notify hosts with SHARED read requests that the cache line is updated. As noted below, this is the responsibility of the software.

In an example, the ANY read request, the SHARED read request, or the invalidation request can be transmitted on the CXL interlink. In an example, the CXL interlink operates in accordance with a CXL 3.0 specification. Although the examples described herein are discussed in the context of CXL, other memory access mechanisms can benefit from this hybrid coherency technique. In an example, the invalidation request is a CXL back-invalidate request. This request is an instruction for the host 110 to write the data back to the memory system 125 and then invalidate the cache line.

The software aspect of the hybrid coherency generally operates from the hosts. Thus, executing on the host 110 can configure the host 110 to alert a group of hosts (e.g., including the host 160) that data in the cache line is changed. It is not necessary that the software be executing on the host 110 to coordinate coherency protocols in the other hosts. For example, the host 160 can be configured by software to poll a memory location to determine whether it should invalidate a local cache because the memory to which the cache corresponds has been changed. In another example, a software developer, or a compiler, can determine that a memory write occurs and may impact other components of the system 105. The compiler can, for example, note the logical memory address of the changed memory line and attempt to find other components, which can be running on different hardware of the system 105, that have a read request for such memory. In another example, when the system 105, including software, is implemented, care can be taken as to what device entities are attempting to access the same memory (e.g., via address matching in a compiler or the like). For example, a publication-subscription (pub-sub) list of facilities in the system 105 can be used with respect to the cache line. A publication that a change has occurred can be made to the pub-sub list and subscribers are notified (e.g., to invalidate local caches, re-read the cache line, etc.) In any case, the software executing on the various hosts reading the cache line is responsible for cache coherence across these entities.

In an example, the host 110 is configured by the software to alert the group of hosts in a communication based on completion of a software segment executed by the second host. Thus, the software design can be used to enable more efficient communications. For example, if a function in the software updates several cache lines at once, then coherency signals may be reduced by waiting until the several lines are written and flushed.

Figure 2:
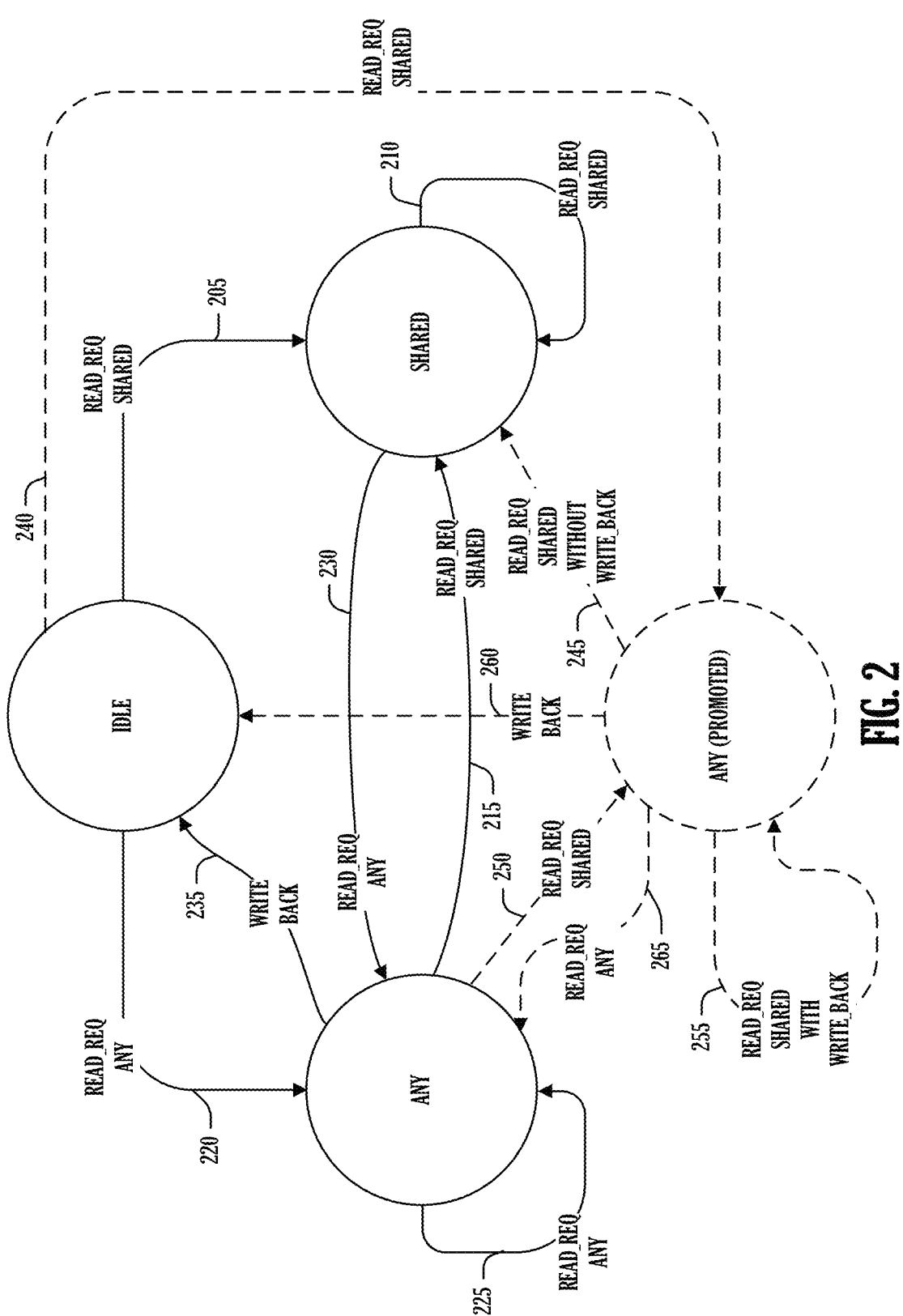
FIG. 2 illustrates a state transition diagram for a device implementing hybrid cache coherency, according to an embodiment.

FIG. 2 illustrates a state transition diagram for a device implementing hybrid cache coherency, according to an embodiment. As noted above, simplified hardware can be used in hybrid coherency. In an example, the hardware can track an access state (e.g., ANY or SHARED) of a cache line in a state machine. For example, an implementation can record a current state and then transitions to another state given an event. FIG. 2 provides several examples of these states and transitions. For example, when the current state of the cache line is IDLE (e.g., no entity is reading or writing to the cache line) and an ANY request is received, the transition 220 occurs to change the state to ANY. In an example, the host ID of the host making the ANY request is recorded to enable the memory controller, for example, to contact the host to reclaim the cache line. Cache line reclamation (e.g., a back-invalidation) may be prompted by receipt of another SHARED or ANY request, for example. Accordingly, when the state is ANY, then the host ID is saved, for example in CXL as meta state for the cache line, for later use in a back invalidate operation.

When the state is SHARED, then no additional state is saved. As noted above, a pre-determined value of a host ID, such as all ones, can be used to indicate the SHARED state. In an example, a Boolean (e.g., single bit) can be used for this purpose.

When in the IDLE state and a SHARED request (e.g., a "ReadReq Shared") is received, the state machine transitions to the SHARED state (transition 205). SHARED requests may not perform optimally when there is likely to be a write request by the same host. Accordingly, it can be beneficial to treat some SHARED requests as ANY requests under certain circumstances. An example of the promotion of SHARED requests to ANY requests are the state ANY (PROMOTED) and transitions that are illustrated with dashed lines.

For example, from IDLE, if there is evidence (e.g., pattern in logs or the like) that a recently received SHARED request will likely perform a subsequent write back to the memory device—e.g., following a back-invalidate request from the memory device or cache flush of the requesting host—the state can move to ANY (PROMOTED) (transition 240). The ANY (PROMOTED) state can transition (transition 265) to the ANY state when the host makes an ANY read request. When a read request is received—from any host—while in either the ANY state or in the ANY (PROMOTED) state, the device communicates an invalidation request to the host (e.g., a back-invalidate request) to recall and control the line. The host here is the host that has set the line into the ANY state. If the invalidation (e.g., recall) request response indicates that the host wrote the data line in the ANY (PROMOTED) state, then the transition 255 back to the ANY (PROMOTED) state is followed. Otherwise, when the response indicates that the host only read the line, then the transition 245 is followed to the SHARED state.

In general, a host processor issues an ANY read request when a store instruction is executed and a SHARED read request when a load instruction is executed. In an example, if a locked read-modify-write operation is performed, the host would issue an ANY request type.

As illustrated, from the IDLE state, the coherency hardware enables the transition 220 to the ANY state when an ANY request is received, and the transition 205 to the SHARED state when a SHARED request is received. From the ANY state, the state machine enables the transition 235 make to the IDLE state when the data is written back to memory. If another ANY request is received while in the ANY state, the state machine does not change state and remains in the ANY state (illustrated as transition 225 though nothing may occur within the hardware). If a SHARED request is made when in the ANY state, the state machine transitions to the SHARED state (transition 215). Behind the scenes, a back-invalidate, or similar request, will be made to the host that made the ANY request to provoke a writeback and put the cache line in a consistent state. At this point, shared access hosts can access the data in the cache line.

When in the shared state, the state machine does not change state when a SHARED request is received (transition 210). However, if an ANY request is received while in the SHARED state, the state machine transitions to the ANY state (transition 230).

Hybrid coherency provides several benefits over traditional software and hardware coherency mechanisms. For example, hybrid coherency reduces hardware resources (e.g., avoiding storage for host ID sharing list) and eliminates broadcasting memory line invalidates to host caches found in hardware coherency techniques. Hybrid coherency also enables support for ISA (or the like) level atomic operations and eliminates host data flush operations just prior to issuing near memory assist operations.

Hybrid coherency maintains additional metadata per memory line than in other coherency arrangements. For example, if 256 hosts with Block Addressing, Decoupling, and Scrubbing (BADS), then eight additional meta state bits are used. This data can be saved in the BADS GFAM media or held in a SRAM based snoop filter, for example. Hybrid coherency also manages timing to ensure that host-timeouts do not occur while sequentially working through host requests. For example, if every one of the 256 hosts makes a request to the same memory line simultaneously (or within a threshold period of time), the memory controller is configured to work its way through each host's request sequentially within a set period of time in order to process a request before a host request timeout occurs.

In an example, an operating system (OS), or other software, is modified to operate with hybrid coherency. For example, when the OS maps memory into a process, the OS can zero the memory region if the region is volatile memory. If the memory region is persistent, then the data does not need to be zeroed. In either case (e.g., volatile or persistent), before the application accesses the data, the host caches are invalidated by the OS. This addresses a situation in which a previous application left a memory line in the host cache in a SHARED state, the hybrid coherency not invalidating host caches. In this example, a failure to invalidate the host caches can allow data to leak between processes, including between virtual machines or containers.

The following illustrates how software (e.g., an application) would use hybrid coherency. The example application has the inner loop of the reverse time migration algorithm. The algorithm starts with a three-dimensional (3D) set of grid points. In each time step, the kernel reads the previous time's data (e.g., the input 3D set of points) and produces the current time data (e.g., a second, output 3D set of points). On the next time interval, the roles of the input and output 3D set of points change. Thus, for each time step, the roles of the two 3D sets of points swap. For a given time interval, each output point is calculated using a stencil of input points. A 7-point stencil may look at the three points in the positive and negative direction in the X, Y and Z axis.

For a global shared memory system with multiple hosts, the 3D data set can be partitioned across the hosts. Each host can be assigned a 3D sub-grid of points, generally defined to minimize cross host data sharing. Thus, to calculate the next time step, a host uses its own previous data points, plus the adjacent data points calculated from different hosts. It is this adjacent data that is shared, in this example, that the coherency protocol addresses to ensure that the latest data (e.g., consistent or coherent data) is being accessed by the host. Here, the inner loop can include the following:

1. Invalid adjacent input data (e.g., accessed on previous loop iteration).
2. Perform stencils to calculate current time step outputs.
3. Inform other hosts of completion of time step.

Operation one invalidates the adjacent input data. Local data from previous time steps is generally written by this same host and thus does not need invalidating. Generally, the invalidation performed in the first operation is performed after the previous step's barrier has completed to avoid issues with potential speculative loads being performed by a host core. In the third operation, the barrier is usually implemented as a counting semaphore plus a release mechanism once all hosts have incremented the semaphore. With hybrid coherency a counting semaphore can be implemented in ISA (or other memory controller) atomic instructions. A higher performance approach can use NMC atomic memory operations, or an NMC event barrier mechanism.

Figure 3:
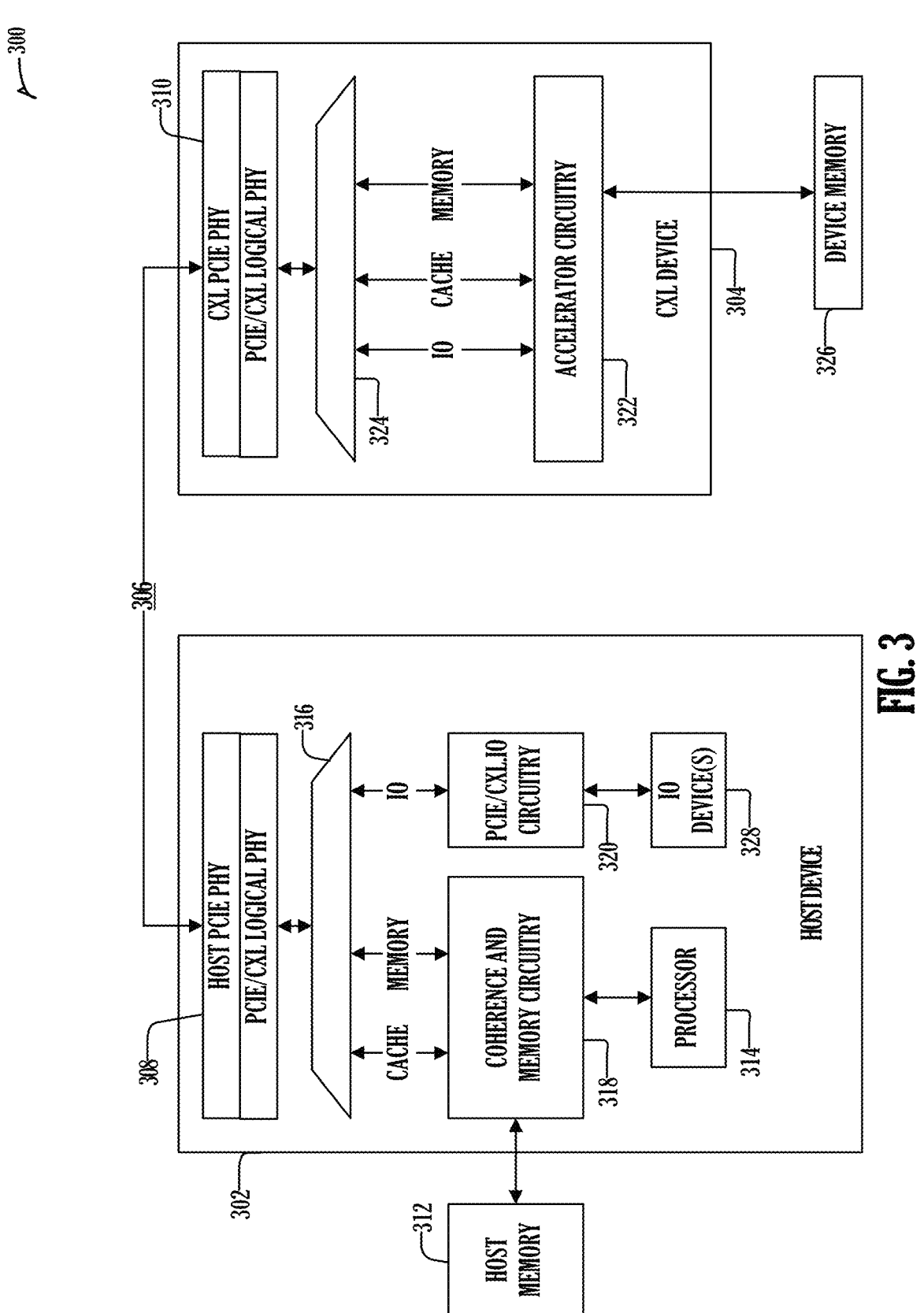
FIG. 3 illustrates an example of a host connected to a CXL device, according to an embodiment.

FIG. 3 illustrates an example of a host connected to a CXL device, according to an embodiment. FIG. 3 illustrates generally an example of a CXL system 300 that uses a CXL link 306 to connect a host device 302 and a CXL device 304 via a host physical layer PCIE interface 308 and a CXL client physical layer PCIE interface 310 respectively. In an example, the host device 302 comprises or corresponds to the first host 110 (or the second host 160) and the CXL device 304 comprises or corresponds to the memory system 125 from the example of the system 105 in FIG. 1. A memory system command manager can comprise a portion of the host device 302 or the CXL device 304. In an example, the CXL link 306 can support communications using multiplexed protocols for caching (e.g., CXL.cache), memory accesses (e.g., CXL.mem), and data input/output transactions (e.g., CXL.io). CXL.io can include a protocol based on PCIe that is used for functions such as device discovery, configuration, initialization, I/O virtualization, and direct memory access (DMA) using non-coherent load-store, producer-consumer semantics. CXL.cache can enable a device to cache data from the host memory (e.g., from the host memory 312) using a request and response protocol. CXL.memory can enable the host device 302 to use memory attached to the CXL device 304, for example, in or using a virtualized memory space. In an example, CXL.memory transactions can be memory load and store operations that run downstream from or outside of the host device 302.

In the example of FIG. 3, the host device 302 includes a host processor 314 (e.g., comprising one or more CPUs or cores) and IO device(s) 328. The host device 302 can comprise, or can be coupled to, host memory 312. The host device 302 can include various circuitry (e.g., logic) configured to facilitate CXL-based communications and transactions with the CXL device 304. For example, the host device 302 can include coherence and memory circuitry 318 configured to implement transactions according to CXL-.cache and CXL.mem semantics, and the host device 302 can include PCIe circuitry 320 configured to implement transactions according to CXL.io semantics. In an example, the host device 302 can be configured to manage coherency of data cached at the CXL device 304 using, e.g., its coherence and memory circuitry 318.

The host device 302 can further include a host multiplexer 316 configured to modulate communications over the CXL link 306 (e.g., using the PCIe PHY layer). The multiplexing of protocols ensures that latency-sensitive protocols (e.g., CXL.cache and CXL.memory) have the same or similar latency as a native processor-to-processor link. In an example, CXL defines an upper bound on response times for latency-sensitive protocols to help ensure that device performance is not adversely impacted by variation in latency between different devices implementing coherency and memory semantics.

In an example, symmetric cache coherency protocols can be difficult to implement between host processors because different architectures can use different solutions, which in turn can compromise backward compatibility. CXL can address this problem by consolidating the coherency function at the host device 302, such as using the coherence and memory circuitry 318.

The CXL device 304 can include an accelerator device that comprises various accelerator circuitry 322. In an example, the CXL device 304 can comprise, or can be coupled to, CXL device memory 326. The CXL device 304 can include various circuitry configured to facilitate CXL-based communications and transactions with the host device 302 using the CXL link 306. For example, the accelerator circuitry 322 can be configured to implement transactions according to CXL.cache, CXL.mem, and CXL.io semantics. The CXL device 304 can include a CXL device multiplexer 324 configured to control communications over the CXL link 306. The accelerator circuitry 322 can be one or more processors that can perform one or more tasks. Accelerator circuitry 322 can be a general-purpose processor or a processor designed to accelerate one or more specific workloads. The illustrated accelerator circuitry 322 can implement the hybrid coherency mechanism described above (e.g., in FIG. 1 and FIG. 2).

Figure 4:
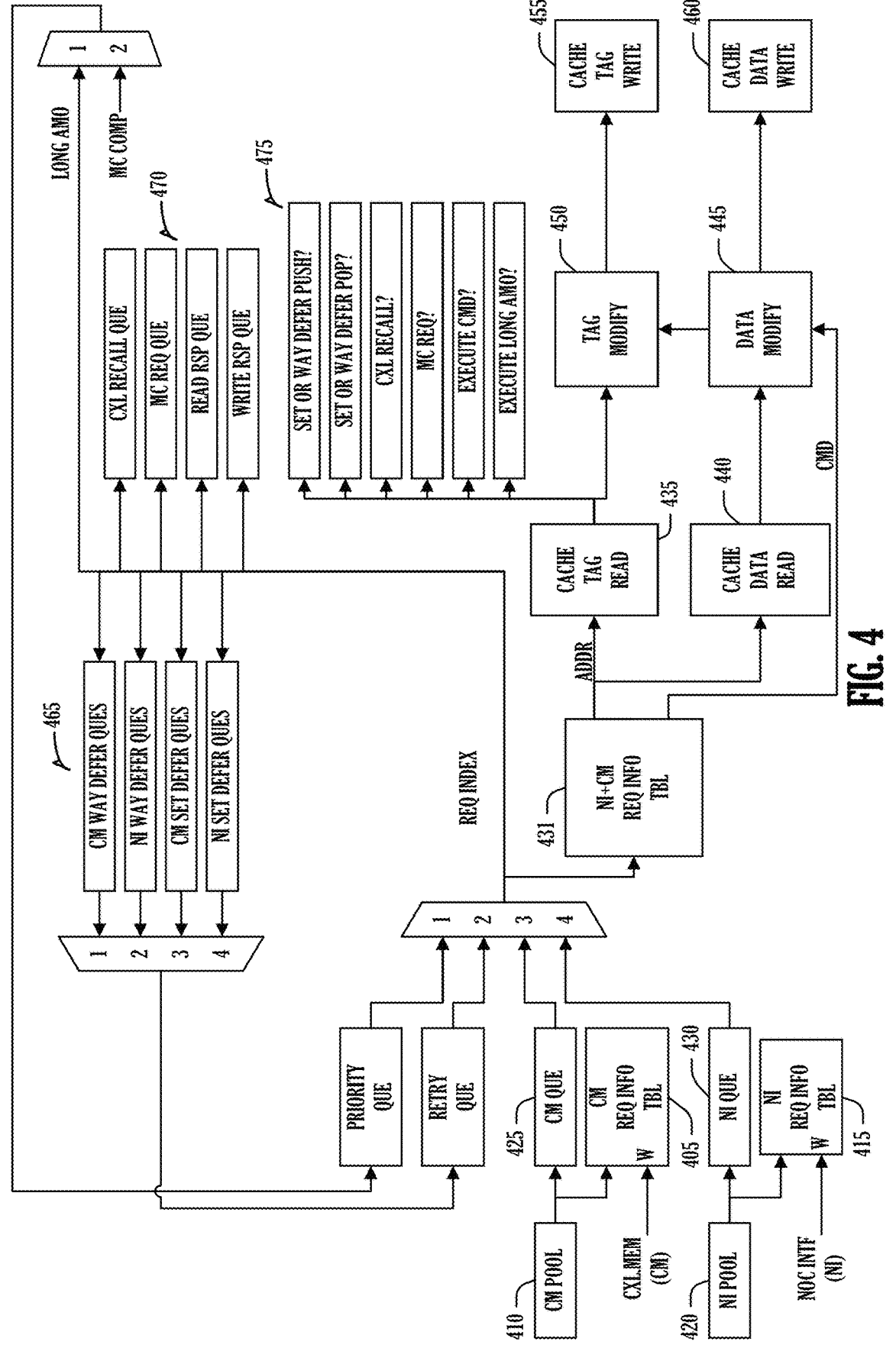
FIG. 4 illustrates example components of a memory device, according to an embodiment.

FIG. 4 illustrates example components of a memory device, according to an embodiment. The illustrated components are part of a memory controller, such as those described above (e.g., the memory controller 130 illustrated in FIG. 1) implementing a memory-side cache (MSC).The illustrated components include elements to address internal (e.g., from a near-memory accelerator) and external (e.g., received from a host via a CXL link) request differences used to maintain CXL protocol requirements, such as maintaining forward progress of CXL memory (CM) requests.

As illustrated, CM refers to CXL memory or other external requests and NI refers to requests coming from a NOC interface or other internal requests. Requests from CXL.mem are written to the CM Request Information Table 405. The entry in the CM Request Information Table 405 to which a request is written is obtained from the CM Request Information Table Pool 410. The CM Request Information Table Pool 410 maintains a list of indices to CM Request Information Table entries that are available (e.g., free, or unused). Requests from an accelerator within the device are written to the NI Request Information Table 415 using the NI Request Information Table Pool 420 for the available entry indices. The two pools—the CM Request Information Table Pool 410 and the NI Request Information Table Pool 420—are configured such that accelerator requests (e.g., internal requests) cannot consume all table entries. Thus, for example, if an additional NI request arrives and there is no free entry indicated in the NI Request Information Table Pool 420, the request is stalled until an entry is available. Here, the request can stay in the in-bound queue until an entry is available.

CXL.mem requests from the CM queue 425 are selected at higher priority than NI requests in the NI queue 430 to ensure forward progress of the CM requests. In an example, as illustrated, when a request is selected from either the CM queue 425 or the NI queue 430, the request information is written into the NI+CM Request Information Table 431. Hereafter, each request is represented in the various queues by an identifier (e.g., index) to an entry of the NI+CM Request Information Table 431. This arrangement can reduce the storage requirements and bandwidth in transferring the request information among the various queues at different processing points in the controller. When an aspect of the request is needed by a processing point, such as an address for a read, the identifier is used to reference the entry in the NI+CM Request Information Table 431 and retrieve the field of the request corresponding to the needed aspect. As with the CM Request Information Table 405 and the NI Request Information Table 415, a free list, or pool, of entries can be used to quickly determine which entries are available to store request information in the NI+CM Request Information Table 431.

When a request is selected, a cache tag 435 for a cache line (e.g., cache way) corresponding to an address in the request is checked to determine whether the requests will be deferred (e.g., processed later). Deferral of the request is generally required when there is no available (e.g., free) way line entry in a cache set for the address in the request. If no deferral occurs, the cache data can be read 440 or modified 445 (e.g., for a write), and the way tag can be modified 450. Modifying the tag 450 or the cache data 445 can respectively be written to backing memory, such as in writing the tag data 455 and the cache way data 460.

When the request is deferred, the request entry identifier (e.g., from the NI+CM Request Information Table 431) is pushed to either the CM or NI defer queues 465. The way defer queues 465 are used when there is a way corresponding to the address in the request, but the way is busy (e.g., waiting for another command to complete). The set defer queues 465 are used when there is no way that corresponds to the address. The request remains queued until a way is available (e.g., not busy). In an example, there are separate CM and NI defer queues 465 for each cache set within the cache.

The external control queues 470 manage external responses to the cache, such as responses to reads or writes to the backing memory, memory controller (MC) requests, or CXL recalls. A CXL recall is a request by the memory device to regain control of a cache way from the host. The recall is requested of the host and the host communicates the control of the cache way to the memory controller, for example, in CXL meta state. This procedure can be called a bias flip as the control bias for the cache way is flipped from the host to the controller or vice versa. This technique is used to enable cache coherency between any host cache and the memory device.

The command queues 475 track requests through a variety of processing points, such as whether to push or pop requests from defer queues 465, whether a CXL recall is initiated, memory controller requests, executing a command, or executing an atomic memory operation (AMO). The reference to a long AMO is an AMO that cannot complete within a single execution cycle (e.g., a clock cycle). An AMO is a near-memory operation completed by an accelerator of the memory controller.

The illustrated control and data paths are configured such that separate storage, queuing, and request prioritization enables forward progress on CM requests while executing in the presence of NI requests. Thus, CM requests will not be delayed by an NI request.

FIG. 5 illustrates an example of an associative cache 500, according to an embodiment. Here, the associative cache 500 includes four cache sets, cache set zero 505, cache set one 510, cache set two 515, and cache set three 520. Note that each cache set corresponds to a memory address range. Thus, cache set one corresponds to all memory elements with an address prefixed by 00 while cache set three 515 corresponds to all memory elements with an address prefixed by 10. The cache lines within each cache set represent a storage element (e.g., register) sized for an element in the memory. Each cache line can also be called a "way." Thus, as illustrated, the associated cache 500 is a four-way associative cache because four ways can be used for each cache set. Generally, memory requests with addresses in one cache set will load a way until all of the ways are used. With the arrival of another memory request, a process to evict a way to load the new data can be undertaken to free the way for the new memory request.

The associative cache 500 can maintain metadata for the ways. Thus, as illustrated, the associative cache 500 includes a tag (e.g., metadata) in addition to the way data, resulting in the way zero tag and data 525, the way one tag and data 530, the way two tag and data 535, and the way three tag and data 540. Examples of tag data can include a dirty bit to indicate whether the way is out-of-sync with the backing memory, whether there is an operation to synchronize the way with host memory (e.g., a host recall is underway), or CXL meta-state, request state, among others. In an example, when the source (e.g., internal, or external) of the request impacts operation of the memory controller, the tag data can include designation of whether the request is internal or external as well as, for example, whether the request is internal and deferred, or external and deferred.

Figure 6:
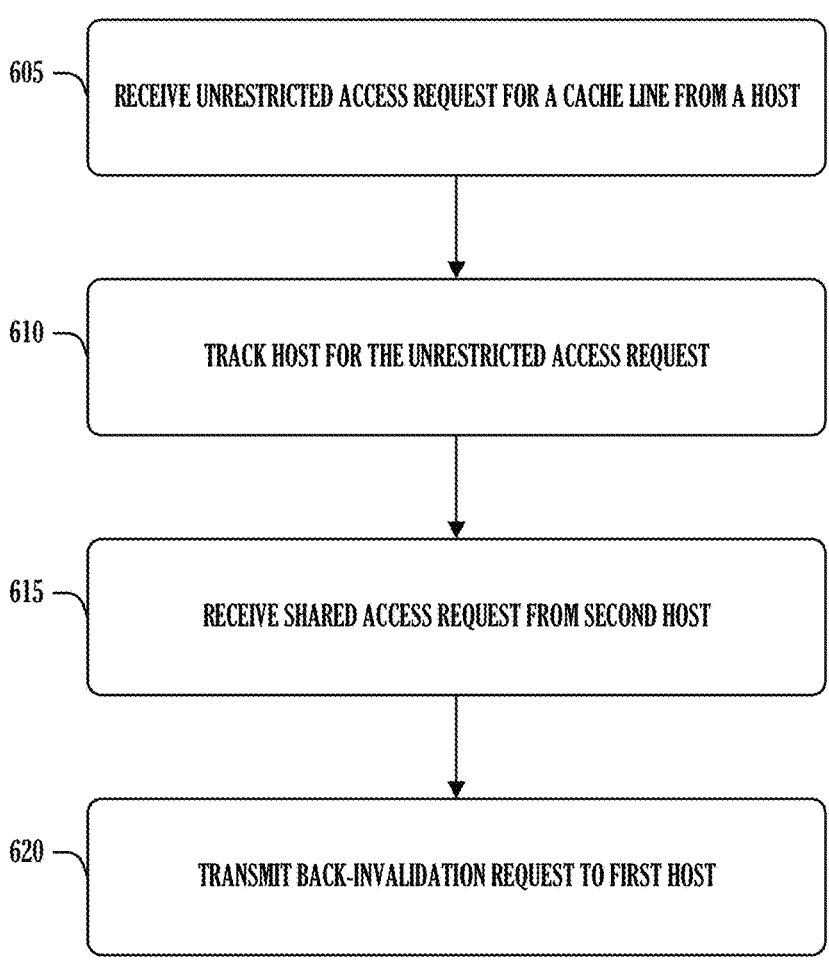
FIG. 6 illustrates a flow diagram of an example of a method for hybrid cache coherency, according to an embodiment.

FIG. 6 illustrates a flow diagram of an example of a method 600 for hybrid cache coherency, according to an embodiment. The operations of the method 600 are performed by a device and implemented in hardware (e.g., computational hardware) such as that described above or below (e.g., processing circuitry).

At operation 605, the device receives an unrestricted-access (e.g., ANY) read request—from a first host—that corresponds to a cache line. In an example, the device is a memory controller. In an example, the device is included in a memory controller in a memory device that includes memory and a processor configured to perform a near-memory compute operation.

At operation 610, an indication of the unrestricted-access (ANY) read request with respect to the cache line is recorded in the device. In an example, the indication includes an identifier for the first host.

At operation 615, a shared-access (SHARED) read request for the cache line is received at the device from a second host.

At operation 620, the device communicates an invalidation request for the cache line to the first host using the identifier for the first host that was previously recorded. In an example, the device refrains (e.g., does not) record an identifier for the second host based on the shared-access read request. In an example, the invalidation request is communicated to the first host based on (e.g., in response to) the shared-access read request. In an example, the unrestricted-access read request, the shared-access read request, or the invalidation request were transmitted on a Compute Express Link (CXL) interlink. In an example, the CXL interlink operates in accordance with a CXL 3.0 specification.

In an example, software executing on the first host configures the first host to alert a group of hosts—which includes the second host—that data in the cache line is changed. In an example, the first host is configured to alert the group of hosts in a communication based on completion of a software segment executed by the second host.

In an example, the method 600 can be expanded to include the operations of receiving a second shared-access read request corresponding to the cache line from a third host prior to receipt of the unrestricted-access read request, and refraining from notifying the third host with respect to the cache line and an updated condition of the cache line after the invalidation request is resolved.

In an example, the method 600 can be expanded to include the operations of receiving a second shared-access read request corresponding to the cache line from a third host after receipt of the unrestricted-access read request, and promoting the second shared-access read request to a second unrestricted-access read request based on a measurement made by the device. In an example, the measurement is a pattern in requests. In an example, the pattern includes a write request following a shared-access read request. In an example, the pattern is in requests made by a single host (e.g., the third host). In an example, the pattern is in requests made by all hosts.

In an example, promoting the shared-access read request to the second unrestricted-access read request includes a determination that the first host did not write-back data to the cache line in response to the invalidation request. In an example, the device is configured to transition the second shared-access read request to a SHARED state in response to an additional shared-access read request arriving before the second shared-access read request is fully promoted.

Figure 7:
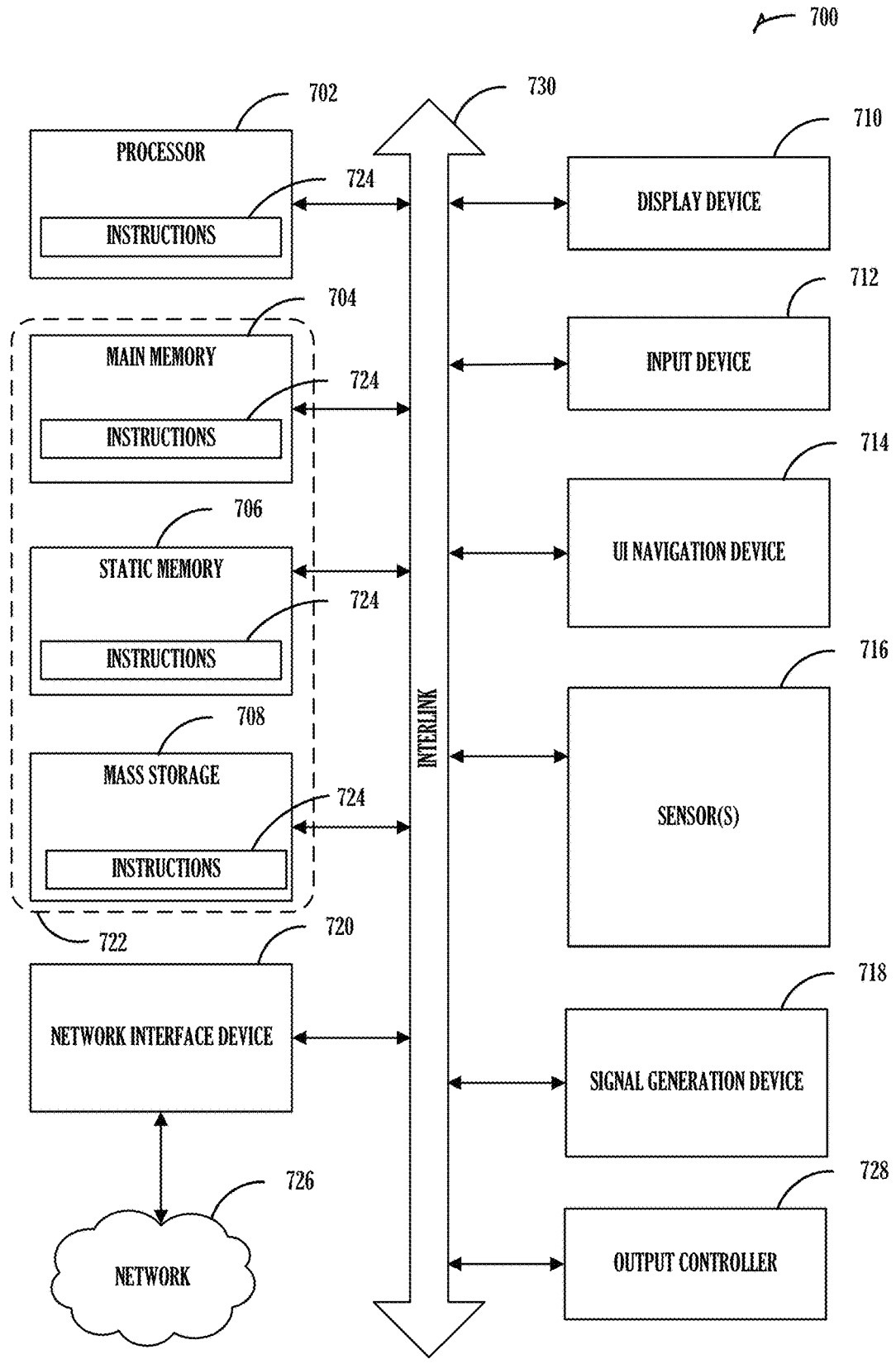
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. Examples, as described herein, may include, or may operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership may be flexible overtime. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 may include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drives, tape drives, flash storage, or other block devices) some or all of which may communicate with each other via an interlink (e.g., bus) 730. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 708, a signal generation device 718 (e.g., a speaker), a network interface device 730, and one or more sensors 716, such as a global positioning system (GPS) sensor, compass, accelerometer, or another sensor. The machine 700 may include an output controller 738, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 may be, or include a machine readable medium 732 on which is stored one or more sets of data structures or instructions 734 (e.g., software) embodying or utilized by any one or more of the techniques or functions described herein. The instructions 734 may also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 may constitute the machine readable media 732. While the machine readable medium 732 is illustrated as a single medium, the term "machine readable medium" may include a single medium or multiple media (e.g., a centralized or distributed database, and/or associated caches and servers) configured to store the one or more instructions 734.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon-based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 732 may be representative of the instructions 734, such as instructions 734 themselves or a format from which the instructions 734 may be derived. This format from which the instructions 734 may be derived may include source code, encoded instructions (e.g., in compressed or encrypted form), packaged instructions (e.g., split into multiple packages), or the like. The information representative of the instructions 734 in the machine readable medium 732 may be processed by processing circuitry into the instructions to implement any of the operations discussed herein. For example, deriving the instructions 734 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 734.

In an example, the derivation of the instructions 734 may include assembly, compilation, or interpretation of the information (e.g., by the processing circuitry) to create the instructions 734 from some intermediate or preprocessed format provided by the machine readable medium 732. The information, when provided in multiple parts, may be combined, unpacked, and modified to create the instructions 734. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 734 may be further transmitted or received over a communications network 736 using a transmission medium via the network interface device 730 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 730 may include one or more physical jacks (e.g., Ethernet, coaxial, or phone jacks) or one or more antennas to connect to the communications network 736. In an example, the network interface device 730 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

ADDITIONAL NOTES & EXAMPLES

Example 1 is a device for hybrid cache coherency, the device comprising: a first interface configured to interface with memory configured to hold data for hosts; a second interface configured to communicate with the hosts; and processing circuitry configured to: receive, on the first interface, an unrestricted-access read request for the memory and corresponding to a cache line, the unrestricted-access read request from a first host; record an indication of the unrestricted-access read request with respect to the cache line, the indication including an identifier for the first host; receive, on the first interface, a shared-access read request for the cache line from a second host; and communicate, on the first interface, an invalidation request for the cache line to the first host using the identifier for the first host that was recorded, the invalidation request communicated based on the shared-access read request, the device refraining from recording an identifier for the second host based on the shared-access read request.

In Example 2, the subject matter of Example 1, wherein the processing circuitry is configured to: receive, on the first interface, a second shared-access read request corresponding to the cache line from a third host prior to receipt of the unrestricted-access read request; and refrain from notifying the third host with respect to the cache line and an updated condition of the cache line after the invalidation request is resolved.

In Example 3, the subject matter of any of Examples 1-2, wherein software executing on the first host configures the first host to alert a group of hosts including the second host that data in the cache line is changed.

In Example 4, the subject matter of Example 3, wherein the first host is configured to alert the group of hosts in a communication based on completion of a software segment executed by the second host.

In Example 5, the subject matter of any of Examples 1-4, wherein the processing circuitry is configured to: receive, on the first interface, a second shared-access read request corresponding to the cache line from a third host after receipt of the unrestricted-access read request; and promote the second shared-access read request to a second unrestricted-access read request based on a measurement made by the device.

In Example 6, the subject matter of Example 5, wherein the measurement is a pattern in requests, the pattern including a write request following a shared-access read request.

In Example 7, the subject matter of Example 6, wherein the pattern is in requests made by the third host.

In Example 8, the subject matter of any of Examples 6-7, wherein the pattern is in requests made by all hosts.

In Example 9, the subject matter of any of Examples 5-8, wherein, to promote the shared-access read request to the second unrestricted-access read request, the processing circuitry is configured to make a determination that the first host did not write-back data to the cache line in response to the invalidation request.

In Example 10, the subject matter of any of Examples 5-9, wherein the processing circuitry is configured to transition the second shared-access read request to a SHARED state in response to an additional shared-access read request arriving before the second shared-access read request is fully promoted.

In Example 11, the subject matter of any of Examples 1-10, wherein the first interface is a Compute Express Link (CXL) interlink.

In Example 12, the subject matter of Example 11, wherein the CXL interlink operates in accordance with a CXL 3.0 specification.

In Example 13, the subject matter of any of Examples 11-12, wherein the invalidation request is a CXL back-invalidate command.

In Example 14, the subject matter of any of Examples 1-13, wherein the device is a memory controller for the memory.

Example 15 is a method for hybrid cache coherency, the method comprising: receiving, by a device, an unrestricted-access read request corresponding to a cache line, the unrestricted-access read request from a first host; recording, by the device, an indication of the unrestricted-access read request with respect to the cache line, the indication including an identifier for the first host; receiving, by the device, a shared-access read request for the cache line from a second host; and communicating, by the device, an invalidation request for the cache line to the first host using the identifier for the first host that was recorded, the invalidation request communicated based on the shared-access read request, the device refraining from recording an identifier for the second host based on the shared-access read request.

In Example 16, the subject matter of Example 15, comprising: receiving, by the device, a second shared-access read request corresponding to the cache line from a third host prior to receipt of the unrestricted-access read request; and refraining, by the device, from notifying the third host with respect to the cache line and an updated condition of the cache line after the invalidation request is resolved.

In Example 17, the subject matter of any of Examples 15-16, wherein software executing on the first host configures the first host to alert a group of hosts including the second host that data in the cache line is changed.

In Example 18, the subject matter of Example 17, wherein the first host is configured to alert the group of hosts in a communication based on completion of a software segment.

In Example 19, the subject matter of any of Examples 15-18, comprising: receiving, by the device, a second shared-access read request corresponding to the cache line from a third host after receipt of the unrestricted-access read request; and promoting the second shared-access read request to a second unrestricted-access read request based on a measurement made by the device.

In Example 20, the subject matter of Example 19, wherein the measurement is a pattern in requests, the pattern including a write request following a shared-access read request.

In Example 21, the subject matter of Example 20, wherein the pattern is in requests made by the third host.

In Example 22, the subject matter of any of Examples 20-21, wherein the pattern is in requests made by all hosts.

In Example 23, the subject matter of any of Examples 19-22, wherein promoting the shared-access read request to the second unrestricted-access read request includes a determination that the first host did not write-back data to the cache line in response to the invalidation request.

In Example 24, the subject matter of any of Examples 19-23, comprising transitioning the second shared-access read request to a SHARED state in response to an additional shared-access read request arriving before the second shared-access read request is fully promoted.

In Example 25, the subject matter of any of Examples 15-24, wherein the unrestricted-access read request, the shared-access read request, or the invalidation request were transmitted on a Compute Express Link (CXL) interlink.

In Example 26, the subject matter of Example 25, wherein the CXL interlink operates in accordance with a CXL 3.0 specification.

In Example 27, the subject matter of any of Examples 25-26, wherein the invalidation request is a CXL back-invalidate command.

In Example 28, the subject matter of any of Examples 15-27, wherein the device is a memory controller.

Example 29 is a machine-readable medium including instructions for hybrid cache coherency, the instructions, when executed by processing circuitry of a device, cause the processing circuitry to perform operations comprising: receiving an unrestricted-access read request corresponding to a cache line, the unrestricted-access read request from a first host; recording an indication of the unrestricted-access read request with respect to the cache line, the indication including an identifier for the first host; receiving a shared-access read request for the cache line from a second host; and communicating an invalidation request for the cache line to the first host using the identifier for the first host that was recorded, the invalidation request communicated based on the shared-access read request, the device refraining from recording an identifier for the second host based on the shared-access read request.

In Example 30, the subject matter of Example 29, wherein the instructions comprise: receiving a second shared-access read request corresponding to the cache line from a third host prior to receipt of the unrestricted-access read request; and refraining from notifying the third host with respect to the cache line and an updated condition of the cache line after the invalidation request is resolved.

In Example 31, the subject matter of any of Examples 29-30, wherein software executing on the first host configures the first host to alert a group of hosts including the second host that data in the cache line is changed.

In Example 32, the subject matter of Example 31, wherein the first host is configured to alert the group of hosts in a communication based on completion of a software segment.

In Example 33, the subject matter of any of Examples 29-32, wherein the instructions comprise: receiving a second shared-access read request corresponding to the cache line from a third host after receipt of the unrestricted-access read request; and promoting the second shared-access read request to a second unrestricted-access read request based on a measurement made by the device.

In Example 34, the subject matter of Example 33, wherein the measurement is a pattern in requests, the pattern including a write request following a shared-access read request.

In Example 35, the subject matter of Example 34, wherein the pattern is in requests made by the third host.

In Example 36, the subject matter of any of Examples 34-35, wherein the pattern is in requests made by all hosts.

In Example 37, the subject matter of any of Examples 33-36, wherein promoting the shared-access read request to the second unrestricted-access read request includes a determination that the first host did not write-back data to the cache line in response to the invalidation request.

In Example 38, the subject matter of any of Examples 33-37, wherein the instructions comprise transitioning the second shared-access read request to a SHARED state in response to an additional shared-access read request arriving before the second shared-access read request is fully promoted.

In Example 39, the subject matter of any of Examples 29-38, wherein the unrestricted-access read request, the shared-access read request, or the invalidation request were transmitted on a Compute Express Link (CXL) interlink.

In Example 40, the subject matter of Example 39, wherein the CXL interlink operates in accordance with a CXL 3.0 specification.

In Example 41, the subject matter of any of Examples 39-40, wherein the invalidation request is a CXL back-invalidate command.

In Example 42, the subject matter of any of Examples 29-41, wherein the device is a memory controller.

Example 43 is a system for hybrid cache coherency, the system comprising: means for receiving, by a device, an unrestricted-access read request corresponding to a cache line, the unrestricted-access read request from a first host; means for recording, by the device, an indication of the unrestricted-access read request with respect to the cache line, the indication including an identifier for the first host; means for receiving, by the device, a shared-access read request for the cache line from a second host; and means for communicating, by the device, an invalidation request for the cache line to the first host using the identifier for the first host that was recorded, the invalidation request communicated based on the shared-access read request, the device refraining from recording an identifier for the second host based on the shared-access read request.

In Example 44, the subject matter of Example 43, comprising: means for receiving, by the device, a second shared-access read request corresponding to the cache line from a third host prior to receipt of the unrestricted-access read request; and means for refraining, by the device, from notifying the third host with respect to the cache line and an updated condition of the cache line after the invalidation request is resolved.

In Example 45, the subject matter of any of Examples 43-44, wherein software executing on the first host configures the first host to alert a group of hosts including the second host that data in the cache line is changed.

In Example 46, the subject matter of Example 45, wherein the first host is configured to alert the group of hosts in a communication based on completion of a software segment.

In Example 47, the subject matter of any of Examples 43-46, comprising: means for receiving, by the device, a second shared-access read request corresponding to the cache line from a third host after receipt of the unrestricted-access read request; and means for promoting the second shared-access read request to a second unrestricted-access read request based on a measurement made by the device.

In Example 48, the subject matter of Example 47, wherein the measurement is a pattern in requests, the pattern including a write request following a shared-access read request.

In Example 49, the subject matter of Example 48, wherein the pattern is in requests made by the third host.

In Example 50, the subject matter of any of Examples 48-49, wherein the pattern is in requests made by all hosts.

In Example 51, the subject matter of any of Examples 47-50, wherein the means for promoting the shared-access read request to the second unrestricted-access read request include a determination that the first host did not write-back data to the cache line in response to the invalidation request.

In Example 52, the subject matter of any of Examples 47-51, comprising means for transitioning the second shared-access read request to a SHARED state in response to an additional shared-access read request arriving before the second shared-access read request is fully promoted.

In Example 53, the subject matter of any of Examples 43-52, wherein the unrestricted-access read request, the shared-access read request, or the invalidation request were transmitted on a Compute Express Link (CXL) interlink.

In Example 54, the subject matter of Example 53, wherein the CXL interlink operates in accordance with a CXL 3.0 specification.

In Example 55, the subject matter of any of Examples 53-54, wherein the invalidation request is a CXL back-invalidate command.

In Example 56, the subject matter of any of Examples 43-55, wherein the device is a memory controller.

Example 57 is at least one machine-readable medium including instructions that, when executed by processing circuitry, cause the processing circuitry to perform operations to implement of any of Examples 1-56.

Example 58 is an apparatus comprising means to implement of any of Examples 1-56.

Example 59 is a system to implement of any of Examples 1-56.

Example 60 is a method to implement of any of Examples 1-56.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A device for hybrid cache coherency, the device comprising:
   a first interface configured to interface with memory configured to hold data for hosts;
   a second interface configured to communicate with the hosts; and
   processing circuitry configured to:
      receive, on the first interface, an unrestricted-access read request for the memory and corresponding to a cache line, the unrestricted-access read request from a first host;
      record an indication of the unrestricted-access read request with respect to the cache line, the indication including an identifier for the first host;
      receive, on the first interface, a shared-access read request for the cache line from a second host; and
      communicate, on the first interface, an invalidation request for the cache line to the first host using the identifier for the first host, the invalidation request communicated based on the shared-access read request.

2. The device of claim 1, wherein the processing circuitry is configured to:
   receive, on the first interface, a second shared-access read request corresponding to the cache line from a third host prior to receipt of the unrestricted-access read request; and
   refrain from notifying the third host with respect to the cache line and an updated condition of the cache line after the invalidation request is resolved.

3. The device of claim 1, wherein software executing on the first host configures the first host to alert a group of hosts including the second host that data in the cache line is changed.

4. The device of claim 1, wherein the processing circuitry is configured to:

receive, on the first interface, a second shared-access read request corresponding to the cache line from a third host after receipt of the unrestricted-access read request; and promote the second shared-access read request to a second unrestricted-access read request based on a measurement made by the device.

5. The device of claim 4, wherein the measurement is a pattern in requests, the pattern including a write request following a shared-access read request.

6. The device of claim 4, wherein, to promote the shared-access read request to the second unrestricted-access read request, the processing circuitry is configured to make a determination that the first host did not write-back data to the cache line in response to the invalidation request.

7. The device of claim 1, wherein the first interface is a Compute Express Link (CXL) interlink.

8. The device of claim 7, wherein the CXL interlink operates in accordance with a CXL 3.0 specification.

9. The device of claim 1, wherein the processing circuitry is configured to refrain from recording an identifier for the second host based on the shared-access read request.

10. A method for hybrid cache coherency, the method comprising:

receiving, by a device, an unrestricted-access read request corresponding to a cache line, the unrestricted-access read request from a first host;

recording, by the device, an indication of the unrestricted-access read request with respect to the cache line, the indication including an identifier for the first host;

receiving, by the device, a shared-access read request for the cache line from a second host; and communicating, by the device, an invalidation request for the cache line to the first host using the identifier for the first host, the invalidation request communicated based on the shared-access read request.

11. The method of claim 10, comprising:

receiving, by the device, a second shared-access read request corresponding to the cache line from a third host prior to receipt of the unrestricted-access read request; and refraining, by the device, from notifying the third host with respect to the cache line and an updated condition of the cache line after the invalidation request is resolved.

12. A non-transitory machine-readable medium including instructions for hybrid cache coherency, the instructions, when executed by processing circuitry of a device, cause the processing circuitry to perform operations comprising:

receiving an unrestricted-access read request corresponding to a cache line, the unrestricted-access read request from a first host;

recording an indication of the unrestricted-access read request with respect to the cache line, the indication including an identifier for the first host;

receiving a shared-access read request for the cache line from a second host; and communicating an invalidation request for the cache line to the first host using the identifier for the first host, the invalidation request communicated based on the shared-access read request.

13. The non-transitory machine-readable medium of claim 12, wherein the instructions comprise:

receiving a second shared-access read request corresponding to the cache line from a third host prior to receipt of the unrestricted-access read request; and refraining from notifying the third host with respect to the cache line and an updated condition of the cache line after the invalidation request is resolved.

14. The non-transitory machine-readable medium of claim 12, wherein software executing on the first host configures the first host to alert a group of hosts including the second host that data in the cache line is changed.

15. The non-transitory machine-readable medium of claim 12, wherein the instructions comprise:

receiving a second shared-access read request corresponding to the cache line from a third host after receipt of the unrestricted-access read request; and promoting the second shared-access read request to a second unrestricted-access read request based on a measurement made by the device.

16. The non-transitory machine-readable medium of claim 15, wherein the measurement is a pattern in requests, the pattern including a write request following a shared-access read request.

17. The non-transitory machine-readable medium of claim 15, wherein promoting the shared-access read request to the second unrestricted-access read request includes a determination that the first host did not write-back data to the cache line in response to the invalidation request.

18. The non-transitory machine-readable medium of claim 12, wherein the unrestricted-access read request, the shared-access read request, or the invalidation request were transmitted on a Compute Express Link (CXL) interlink.

19. The non-transitory machine-readable medium of claim 18, wherein the CXL interlink operates in accordance with a CXL 3.0 specification.

20. The non-transitory machine-readable medium of claim 12, wherein the processing circuitry is configured by the instructions to refrain from recording an identifier for the second host based on the shared-access read request.

* * * * *